United States Patent [19]

Tsuji et al.

[11] Patent Number: 4,603,598
[45] Date of Patent: Aug. 5, 1986

[54] SHIFT LEVER

[75] Inventors: Shinsaku Tsuji, Ebina; Toshimitsu Kimura, Yokohama; Yasushi Asano; Yasuhito Suzuki, both of Honjo, all of Japan

[73] Assignees: Nissan Motor Co., Ltd., Yokohama; Fuji Koko Co., Ltd., Tokyo, both of Japan

[21] Appl. No.: 658,233

[22] Filed: Oct. 5, 1984

[30] Foreign Application Priority Data

Oct. 13, 1983 [JP] Japan .................... 58-189816

[51] Int. Cl.⁴ .................... G05G 7/16; G05G 9/12
[52] U.S. Cl. .................... 74/473 P; 74/523; 403/221; 403/225
[58] Field of Search .......... 74/473 R, 473 P, 491, 74/523; 403/372, 221, 225

[56] References Cited

U.S. PATENT DOCUMENTS

| 3,315,537 | 4/1967 | Keller | 403/225 X |
| 3,693,467 | 9/1972 | Oehl | 74/523 X |
| 3,732,746 | 5/1973 | Fitzpatrick | 74/523 X |
| 3,800,909 | 4/1974 | Duncanson et al. | 74/523 X |

FOREIGN PATENT DOCUMENTS

| 2353417 | 5/1975 | Fed. Rep. of Germany . |
| 2700239 | 7/1978 | Fed. Rep. of Germany . |
| 46-32887 | 11/1971 | Japan . |
| 47-24818 | 8/1972 | Japan . |
| 2080919 | 2/1982 | United Kingdom . |

Primary Examiner—Allan D. Hermann
Attorney, Agent, or Firm—Schwartz, Jeffery, Schwaab, Mack, Blumenthal & Evans

[57] ABSTRACT

A shift lever is composed of a lower lever section connected to a control rod of a transmission, and an upper lever section formed with a hollow cylindrical portion and provided with a shift lever knob. The lower lever section is formed with an elongate end portion which is being inserted in the hollow cylindrical portion of the upper lever section. Additionally, lower and upper elastomeric insulators spaced from each other are securely mounted on the elongate end portion of the lower lever section. The lower elastomeric insulator is securely connected to the upper lever section cylindrical portion, while the upper elastomeric insulator is adapted to form a clearance between it and the upper lever section cylindrical portion, thereby avoiding contact between the upper elastomeric insulator and the upper lever section cylindrical portion upon the shift lever being not operated.

10 Claims, 3 Drawing Figures

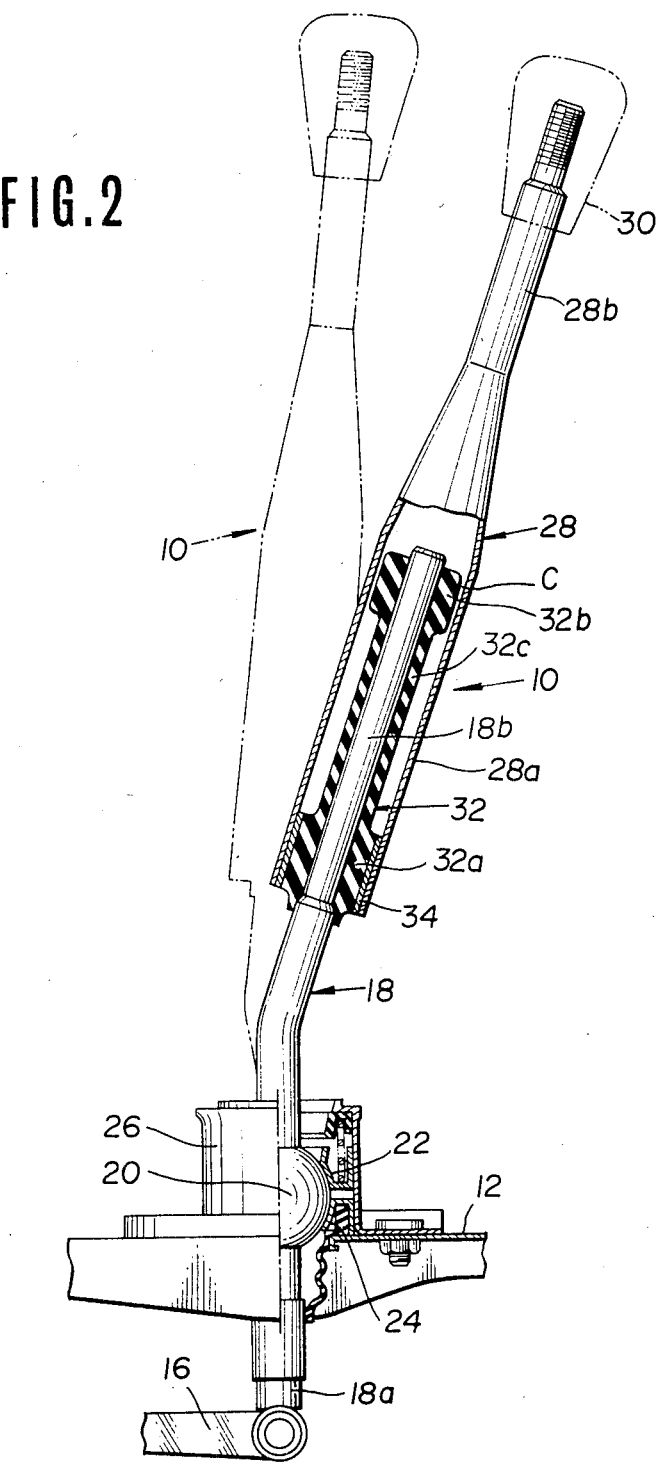

SHIFT LEVER

BACKGROUND OF THE INVENTION

1. Field of the Invention

This invention relates to a shift lever for operating a transmission of automotive vehicles and the like, and more particularly to an improvement in the shift lever of the type including lower and upper lever sections which are connected with each other through an elastomeric insulator.

2. Description of Prior Art

In connection with noise reduction in automotive vehicles and the like, it has hitherto been proposed that a shift lever includes upper and lower lever sections which are connected to each other through an elastomeric insulator, in order to prevent transmission of noises (particularly, generated in a high engine speed range of from 4,000 to 6,000 rpm) from an engine and a transmission to the inside of a passenger compartment.

However, drawbacks have been encountered in such a shift lever in which it is difficult to make compatible a required vibration prevention effect and a good operation feeling of the shift lever in case the shift lever employs a usual elastomeric insulator, for example, made of rubber while being so designing as not to become unnecessarily large-sized.

In other words, if the hardness of the elastomeric insulator is lowered to improve vibration prevention effect, particularly, for vibrations in vertical directions, the operation feeling of the shift lever is unavoidably degraded. On the contrary, if the elastomeric insulator hardness is raised to prevent the degradation of shift lever operation feeling, the vibration from the engine and the transmission tends to be transmitted to the upper lever section of the shift lever, thus resulting in booming noise within the passenger compartment of the vehicle.

SUMMARY OF THE INVENTION

A shift lever of the present invention is composed of a first lever section having an elongate end portion, and a second lever section having an elongate hollow cylindrical portion into which the first lever section end portion is inserted. Additionally, first and second elastomeric insulators are securely mounted on the first lever section end portion and spaced from each other in the axial direction of the first lever end portion. The first elastomeric insulator is securely connected with the inner peripheral surface of the second lever section cylindrical portion, while the second elastomeric insulator is such adapted to leave a clearance between the outer peripheral surface of the second elastomeric insulator and the inner peripheral surface of the second lever section cylindrical portion.

Accordingly, vibration transmission between the first and second lever sections is effectively and sharply reduced under the action of the clearance between the second elastomeric insulator and the second lever section cylindrical portion when the shift lever is not operated by a driver, while good shift lever operation feeling can be obtained upon the contact of the second elastomeric insulator with the second lever section cylindrical portion when the shift lever is operated by the driver to make shifting action of the transmission, thus making compatible a required vibration prevention effect and a good operation feeling of the shift lever.

BRIEF DESCRIPTION OF THE DRAWINGS

The features and advantages of the shift lever of the present invention will be more appreciated from the following description taken in conjunction with the accompanying drawings in which like reference numerals designate corresponding parts and elements, in which:

FIG. 2 is a vertical sectional view showing the structure of the shift lever and the support arrangement of FIG. 1.

DETAILED DESCRIPTION OF THE INVENTION

Figure 1:
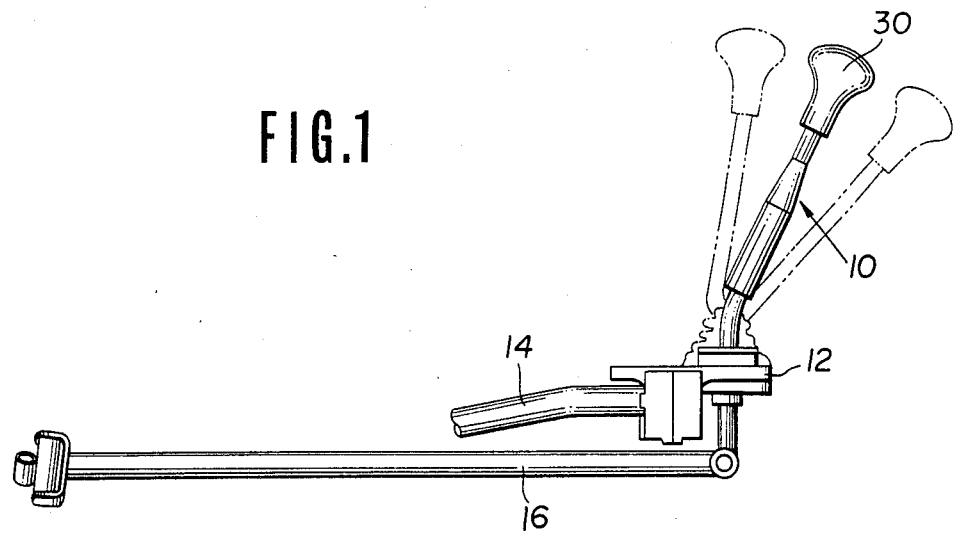
FIG. 1 is a schematic illustration of a preferred embodiment of the shift lever in accordance with the present invention, and a support arrangement thereof.

Referring now to FIGS. 1 and 2, a preferred embodiment of a shift lever of the present invention is illustrated by the reference numeral 10. The shift lever 10 is operatively connected to a transmission (not shown) in order to control the operation of the transmission. A support bracket 12 is fixedly mounted on a support rod 14 which is extended from the transmission. The shift lever 10 is pivotally supported by the support bracket 12 in such a manner that its lower part is passed through an opening (no numeral) formed in the support bracket 12 and projected downward of the support bracket 12 to be connected to a control rod 16 of the transmission.

The shift lever 10 includes a lower lever section 18 which is formed at its lower part with a ball fulcrum or spherical support section 20 which is movably supported through upper and lower bearing members 22, 24 in a socket 26 of the support bracket 12. A lower end portion 18a of the lower lever section extends downward from the spherical support section 20 to be connected with the control rod 16 of the transmission. An upper end portion 18b of the lower lever section 18 extends upwardly from the spherical support section 20 to be inserted into a hollow cylindrical portion 28a of an upper lever section 28 of the shift lever 10.

The upper lever section 28 is formed at its lower part with the hollow cylindrical portion 28a. A knob 30 is securely mounted on the upper end of the upper lever. As shown, the upper end portion 18b of lower lever section 18 is connected to the hollow cylindrical portion 28a of the upper lever section 28 through an elastomeric insulator 32 made of rubber or the like. The elastomeric insulator 32 is fixedly mounted on the upper end portion 18b of the lower lever section 18, for example, under adhesion upon baking. The insulator 32 includes lower and upper insulator sections 32a, 32b which are spaced from each other in the axial direction of the lower lever section upper end portion 18b but integral with each other through a connecting section 32c. In this case, each of the upper, lower and connecting sections 32a, 32b, 32c is cylindrical and has an annular cross-section.

The lower insulator section 32a is adhered at its outer peripheral surface onto the inner wall surface of a cylindrical collar or sleeve 34 upon baking and therefore under a condition in which a preload is applied to the lower insulator section 32a. The thus incorporated collar 34 with the lower insulator section 32a is press-fitted in the cylindrical portion 28a at the bottom part. The upper insulator section 32b is located on the upper extreme end part of the upper end portion 18b of the lower lever section 18 and inside the upper lever section cylindrical portion 28a at the top part. It is to be noted that the outer diameter of the upper insulator section 32b is smaller than the inner diameter of the cylindrical portion 28a of the upper lever section 28, thereby forming a slight clearance or space C between the outer peripheral surface of the upper insulator section 32b and the inner peripheral surface of the upper lever section cylindrical portion 28a. It is preferable that the clearance C is such set as to be as small as possible in a range where the upper insulator section 32b cannot be brought into contact with the inner surface of the upper lever section cylindrical portion 28a even upon the displacement of the lower and upper lever sections 18, 28 due to vibration transmitted from an engine (not shown) and the transmission.

With the thus arranged shift lever 10, when engine vibration and the like are transmitted to the shift lever 10 via the control rod 16 of the transmission, such vibrations (particularly in vertical directions) appear to be transmitted from the lower lever section 18 to the upper lever section 28 of the shift lever 10. However, almost all the vibrations are effectively absorbed by the insulator 32. A part of the vibrations which remain unabsorbed by the insulator is transmitted to the upper lever section 28 via the insulator 32. At this time, since the upper insulator section 32b is not in contact with the upper lever section 28, the above-mentioned vibration is transmitted only through the lower insulator section 32a. Accordingly, vibration transmission path area is reduced to approximately ½ that in a case the upper insulator section 32b is also in contact with the upper lever section 28, thereby reducing by half the amount of vibration transmitted to the upper lever section 28. It will be understood that vibration acts on the lower insulator section 32a in shearing direction in this case, and therefore the spring constant of the lower insulator section 32a is minimized thereby to improve vibration absorption effect. As a result, the upper lever section 28 can be effectively avoided from vibration transmission from the lower lever section 18.

Figure 3:
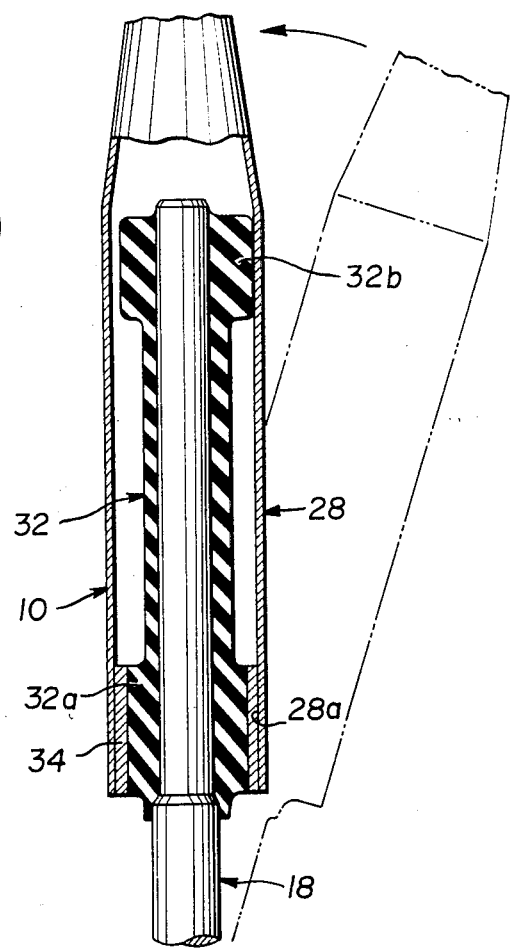
FIG. 3 is an enlarged view, partly in section, of an essential part of the shift lever of FIG. 2, but showing a state in which the shift lever is operated to make shifting action of a transmission.

When gear-change operation for the transmission is made upon operating the shift lever 10, the inner surface of the hollow cylindrical portion 28a of the upper lever section 28 is immediately brought into contact with the upper insulator section 32b along with the movement of the upper lever section 28 as shown in FIG. 3. Then, the upper lever section 28 are supported through a pair of the insulator sections 32a, 32b thereby to attain stable connection between the lower and upper lever sections 18, 28. As a result, operation load applied to the upper lever section 28 is immediately and securely transmitted to the lower lever section 18 via the lower and upper insulator sections 32a, 32b, so that the lower lever section 18 moves in compliance with the upper lever section 28. It will be understood that there is no apprehension of degrading the stable connection between the lower and upper lever sections 18, 28 and the gear-change feeling of the shift lever 10.

In addition, it will be appreciated that the lower and upper lever section 18, 28 are securely connected to each other through the lower insulator section 32a under the state in which the preload is applied to the lower insulator section in the radial direction, and therefore there is no fear of disconnection of the upper lever section 28 from the lower lever section 18 while improving durability of the lower insulator section 32a.

While the insulator 32 of the above-mentioned embodiment has been shown and described as being such formed that the lower and upper insulator sections 32a, 32b are integral with each other, it will be understood that the lower and upper insulator sections 32a, 32b may be indivdually formed and disposed in position in a spaced relationship with each other. Additionally, although the above-discussed embodiment has been shown and described as of the type wherein the upper end portion 18b of the lower lever section 18 is connected with the cylindrical portion 28a of the upper lever section 28, it will be appreciated that the principle of the present invention may be applied to a shift lever of the type wherein a lower lever section is formed with a cylindrical portion with which a rod-like portion of an upper lever section is connected.

While the lower and upper insulator sections 32a, 32b have been shown and described as being secured on the lower lever section 18 in the above-mentioned embodiment, the lower insulator 32a and/or the upper insulator 32b may be secured onto the inner surface of the upper lever section 28 upon separating them from each other. In this case, it is preferable to cover the lower lever section 18 to some extent with an elastomeric insulator material which is integral with the above-mentioned lower insulator section 32a or otherwise separate from the lower insulator section 32a in which the insulator material is not in contact with the upper lever section 28. Furthermore, it may be possible that the locational relationship between the lower and upper insulator sections 32a, 32b is reversed so that the insulator section 32a is located in place of the insulator section 32b while the insulator section 32b is located in place of the insulator section 32a in which a clearance is formed between the insulator 32b and the inner surface of the upper lever section cylindrical portion 28a.

As appreciated from the above, according to the present invention, the elastomeric insulator disposed between the first and second lever sections is separated into the first and second insulator sections, in which the first insulator section functions to securely connect the first and second lever sections providing vibration insulating effect while the second insulator section functions to establish no connection between the first and second lever sections but establish connection therebetween only during operation of the shift lever thereby to obtain good gear-change feeling, thus improving both vibration insulating effect and gear-change feeling. In addition, according to the present invention, the depth of the elastomeric insulator in its radial direction can be prevented from unnecessarily increasing, thereby effectively avoiding the shift lever from becoming unnecessarily large-sized.

What is claimed is:
1. A shift lever comprising:
a first lever section having an elongate end portion which is substantially rigid;
a second lever section having an elongate hollow cylindrical portion in which said first lever section end portion is disposed;
first and second elastomeric insulators securely mounted on said first lever section end portion and spaced apart from each other in an axial direction of said first lever end portion;

means for securely connecting said first elastomeric insulator with said second lever section cylindrical portion; and means forming a clearance between said second elastomeric insulator and said second lever section cylindrical portion.

2. A shift lever as claimed in claim 1, wherein said clearance forming means includes means for establishing contact between said second elastomeric insulator and said second lever cylindrical portion upon said shift lever being operated.

3. A shift lever as claimed in claim 1, wherein said first lever section is connected to a control rod of a transmission, wherein said second lever section is provided at an end portion opposite to said cylindrical portion with a shift lever knob.

4. A shift lever as claimed in claim 3, wherein said first lever section is provided with a sperhical ball fulcrum through which said first lever section is pivotally supported on a stationary member.

5. A shift lever as claimed in claim 3, wherein said second elastomeric insulator is located nearer to said shift lever knob than said first elastomeric insulator.

6. A shift lever as claimed in claim 5, wherein said first lever section end portion is a straight elongate rod, wherein said second lever section cylindrical portion is so disposed as to be locatable generally coaxial with said first lever section elongate rod.

7. A shift lever as claimed in claim 6, wherein said first elastomeric insulator is cylindrical and has an annular cross-section.

8. A shift lever as claimed in claim 6, wherein said second elastomeric insulator is cylindrical and has an annular cross-section, said cylindrical second insulator being disposed coaxial with said first lever section elongate rod so that a cylindrical clearance is formable between an outer peripheral surface of said second elastomeric insulator and an inner peripheral surface of said second lever section cylindrical portion.

9. A shift lever as claimed in claim 6, wherein said first and second elastomeric insulators are integrally connected with each other through an elastomeric insulator connecting section whose outer peripheral surface is spaced from an inner peripheral surface of said second lever section cylindrical portion.

10. A shift lever comprising:
a first lever section having an elongate end portion;
a second lever section having an elongate hollow cylindrical portion in which said first lever section end portion is disposed;
first and second elastomeric insulators securely mounted on said first lever section end portion and spaced apart from each other in axial direction of said first lever end portion;
means for securely connecting said first elastomeric insulator with said second lever section cylindrical portion;
means forming a clearance between said second elastomeric insulator and said second lever section cylindrical portion; and
a collar disposed between said first elastomeric insulator and said second lever section cylindrical portion in a manner to provide a preload on said first elastomeric insulator.

* * * * *